United States Patent [19]

Breslow et al.

[11] Patent Number: 4,710,873
[45] Date of Patent: Dec. 1, 1987

[54] VIDEO GAME INCORPORATING DIGITIZED IMAGES OF BEING INTO GAME GRAPHICS

[75] Inventors: Jeffrey D. Breslow, Highland Park; Howard J. Morrison, Deerfield; Steven P. Hanson, Winnetka; Russell G. Rasmussen, Skokie, all of Ill.

[73] Assignee: Marvin Glass & Associates, Chicago, Ill.

[21] Appl. No.: 587,990

[22] Filed: Mar. 9, 1984

Related U.S. Application Data

[63] Continuation-in-part of Ser. No. 395,353, Jul. 6, 1982, abandoned.

[51] Int. Cl.⁴ .................. A63F 9/22; G06F 15/44
[52] U.S. Cl. .................. 364/410; 273/85 G; 273/DIG. 28; 358/903
[58] Field of Search .......... 364/410, 521; 358/93, 358/104, 254, 903; 273/85 G, DIG. 28; 340/705, 724, 725

[56] References Cited

U.S. PATENT DOCUMENTS

| | | | |
|---|---|---|---|
| 3,398,664 | 8/1968 | Bonatsos | 358/97 X |
| 3,662,374 | 5/1972 | Harrison, III et al. | 340/725 |
| 3,747,087 | 7/1973 | Harrison, III et al. | 340/703 |
| 3,974,482 | 8/1976 | Balashov et al. | 364/900 |
| 4,060,915 | 12/1977 | Conway | 434/307 |
| 4,075,620 | 2/1978 | Passavant et al. | 340/799 |
| 4,104,625 | 8/1978 | Bristow et al. | 273/DIG. 28 X |
| 4,116,444 | 9/1978 | Mayer et al. | 273/13 |
| 4,276,570 | 6/1981 | Burson et al. | 358/903 |
| 4,305,131 | 12/1981 | Best | 364/521 |
| 4,359,223 | 11/1982 | Baer et al. | 273/85 G |
| 4,445,187 | 4/1984 | Best | 364/410 X |
| 4,521,014 | 6/1985 | Sitrick | 273/1 GC |

Primary Examiner—Jerry Smith
Assistant Examiner—Clark A. Jablon
Attorney, Agent, or Firm—John S. Pacocha

[57] ABSTRACT

Video game apparatus and method includes an arrangement for acquiring and storing data representing an image of the face of a game player or other entity and for selectively incorporating the image of the entity throughout the play of the game at predetermined locations on the video game display and in coordination with the video game graphics. In accordance with the play of the various games controlled by the video game apparatus, the stored image of one or more persons is utilized as the head of a video graphics generated body, as a portion of other generated graphics representations, as a functional game object representation, or as a controllable playing object. The video game apparatus also provides for the display of the game player image in a scoring display format wherein the images of a predetermined number of previous game players attaining the highest scores are displayed at the beginning or end of a play of the game.

18 Claims, 12 Drawing Figures

_Fig 5_

_Fig 7_

VIDEO GAME INCORPORATING DIGITIZED IMAGES OF BEING INTO GAME GRAPHICS

This application is a continuation-in-part of application Ser. No. 395, 353 filed July 6, 1982, abandoned.

BACKGROUND OF THE INVENTION

1. Field of the Invention

This invention relates generally to the field of video game apparatus and more particularly to apparatus for acquiring an image of a game player or other entity and the use of the entity's image with the video generated graphics or imagery of the video game apparatus during the play of a game.

2. Background Art

Various video game apparatus and computer generated video graphics are known for providing animated displays and video games; for example, as disclosed in U.S. Pat. Nos. 4,305,131; 4,116,444; 3,662,374; 3,747,087; 3,974,482; and 4,075,620.

Further, training systems such as military gunnery trainers or flight trainers are known in the prior art that utilize a prerecorded video tape to present life-like scenes, moving targets, landscapes or the like and that utilize overlayed computer generated imagery or graphics to simulate the firing of a weapon or simulated explosion for enhanced realism.

While these arrangements and the video game apparatus of the prior art are generally suitable according to their intended use for providing training, amusement or entertaining game play, there is a constant need for improved entertainment systems and video game apparatus to provide new forms of entertainment and to provide individualized recognition of and interaction of persons including the game player with the game apparatus.

SUMMARY OF THE INVENTION

Accordingly, it is an object of the present invention to provide video game apparatus that acquires an image of the face of a person and that utilizes the acquired image in combination and in coordination with the video game graphics display so as to selectively incorporate the person's image at various locations of the game display throughout the play of the game thereby including the individual in the play of the game as an interactive enhancement feature.

It is another object of the present invention to provide a method of using computer generated pictorials and images in conjunction with computer generated imagery or graphics in an interactive computer controlled video game.

In accordance with a preferred embodiment of the invention there is provided video game apparatus that includes an arrangement for acquiring data representing an image of the face of a person and for selectively incorporating the image of the person throughout the play of the game at predetermined locations on the video game display and in coordination with the video game graphics. In accordance with the play of the various games controlled by the video game apparatus, the stored image of one or more persons is utilized as the head of a video graphics generated body, as a portion of other generated graphics representations, as a functional game object representation, or as a controllable playing object.

DESCRIPTION OF THE DRAWINGS

These and other objects and advantages of the present invention will become apparent by reference to the following description taken in conjunction with the accompanying drawings wherein.

DETAILED DESCRIPTION OF THE PREFERRED EMBODIMENT

Figure 1:
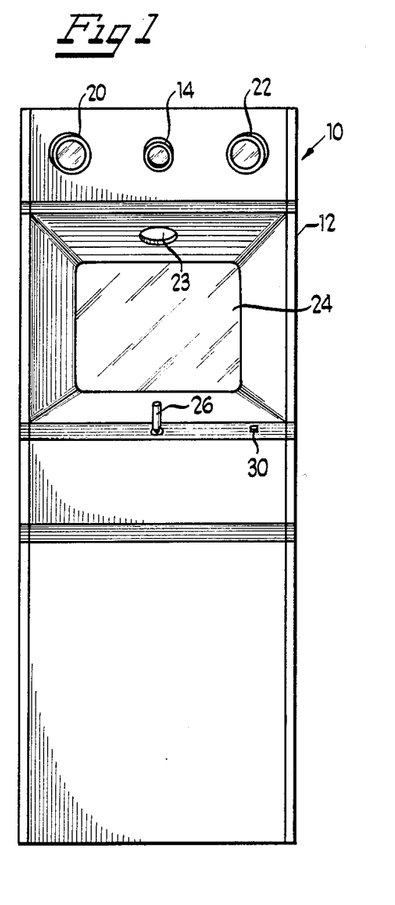
FIG. 1 is a front elevational view of the video game apparatus of the present invention.
Figure 2:
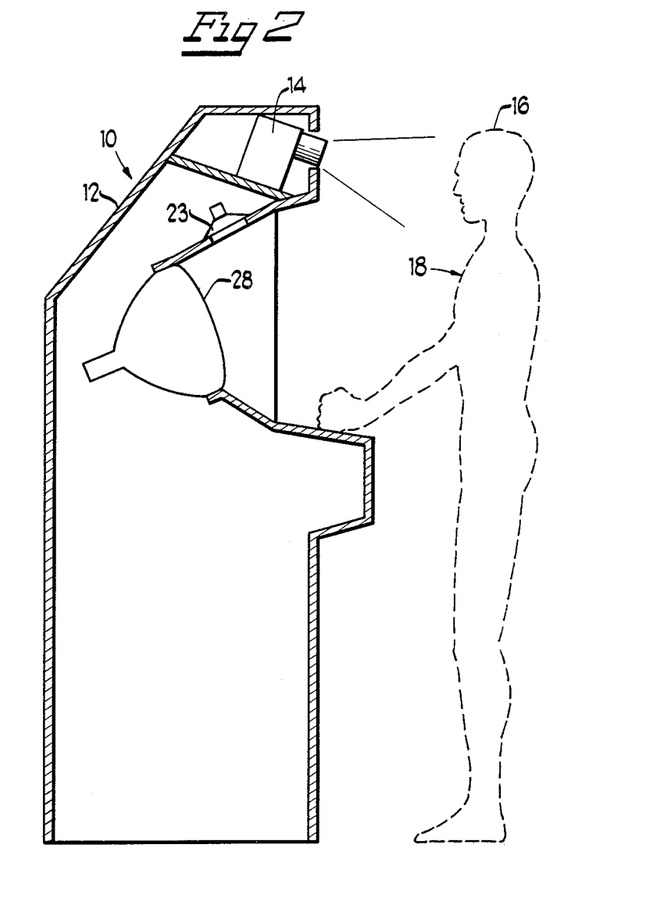
FIG. 2 is a sectional view of the video game apparatus in FIG. 1 illustrating the positioning of a game player.

Referring now to the drawings and with particular attention to FIGS. 1 and 2, the video game apparatus 10 of the present invention includes a housing or enclosure 12. The video game apparatus 10 further includes a video camera 14 that is disposed within the enclosure 12 and operatively positioned to acquire an image of the face and head 16 of a person such as game player 18 with the person being positioned in a predetermined position for operating the video game apparatus 10. Two lighting sources 20, 22 are provided on the video game apparatus 10 for suitably illuminating the face of the person 18 as may be required by the lighting of the environment of the video game apparatus 10. The video game apparatus 10 further includes a speaker 23 for providing suitable audio game effects including prerecorded speech and speech synthesis.

With the person 18 in a predetermined position for operating the video game apparatus 10, the video game apparatus 10 acquires data representing an image of the face or head of the person 18, stores the person's image, and selectively incorporates the person's image in the video display during the play of the game under the control of the video game control circuitry as will be explained in more detail hereinafter. The person's image may be utilized in various games as the head of a video graphics generated body, as a portion of other generated graphics representations, as a functional game object such as a playing paddle or target, or as a controllable playing object.

In the arrangement of FIGS. 1 and 2, after the video game apparatus 10 has been initialized for the play of the game, for example in response to insertion of a coin or token by the game player 18, the video game apparatus 10 prompts the game player 18 to appropriately position himself or herself in front of the transparent display plate 24 and to grasp the game control lever 26 so as to properly center the game player. The video game apparatus in FIGS. 1 and 2 includes a video display device 28, for example a CRT or the like, for displaying the video graphics of the game including the selectively incorporated game player image.

During the initialization of the game when the person's image is being acquired and stored, the video game apparatus 10 also provides a monitor function by displaying the person's image on the display 28 as the person's image is currently being acquired by the camera 14 so as to inform the person 18 of the positioning and facial expression of the person 18. When the person 18 decides that his or her individual image is suitably centered and represents the desired personal image, the person 18 is prompted to operate the control button 30 to condition the video game apparatus 10 to store the person's image for use throughout the game. The surrounding environment behind the person's head is preferably maintained near a black level, for example through the use of a light absorptive backdrop (not shown).

In accordance with various features of the video game apparatus 10 of the present invention, several persons' images are acquired and stored at the initialization of the game with different facial expressions or the like for suitable effect during the play of the game as will be explained in more detail hereinafter. Further, in specific embodiments, the images of several different persons are acquired and stored either during the play of a current game or during the play of previous games.

While the video game apparatus 10 of the present invention is described for illustrative purposes in connection with the associated enclosure 12 and associated apparatus of FIGS. 1 and 2, it should be understood that in various embodiments of the video game apparatus of the present invention other enclosures and associated apparatus are also suitable for the practice of the present invention. For example, while the present invention is described with respect to a prefocused camera 14, the present invention could be implemented by a conventional self-focusing or automatically focusing camera. In addition, while the present invention is described with respect to a camera arranged to record facial features, other features could be recorded as well and incorporated into the play of the game. Moreover, for acquiring the images of persons other than game players and permanent incorporation of those persons' images with game generated graphics, a camera similar to camera 14 could be at a remote location.

Figure 3:
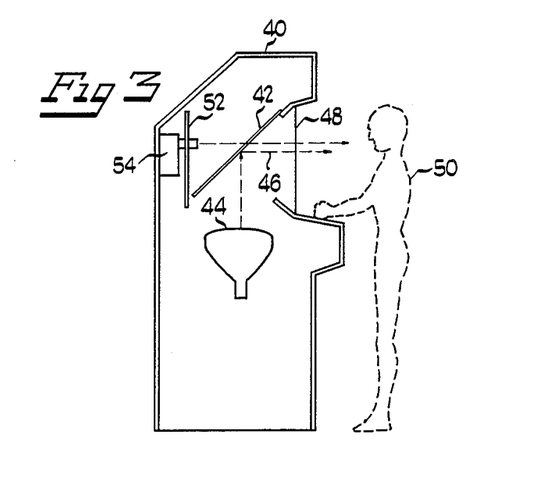
FIG. 3 is a sectional view of an alternate arrangement of the video game apparatus of FIG. 1.

For example and referring now to FIG. 3, an alternate arrangement of the video game apparatus of the present invention is illustrated within an enclosure 40. A half-silvered mirror 42 is provided within the enclosure 40 to receive projected game generated graphics and imagery from a display device 44 so as to project an image of the display 44 in the direction indicated at 46 through a transparent panel 48 to a person 50. Further, a background scene formed on a background display panel 52 is also visible by the person 50 through the half-silvered mirror 42. In the arrangement of FIG. 3, a video camera 54 or other suitable imaging device is provided in the vicinity of the background scene 52 so as to acquire the person's image through the half-silvered mirror 42. The positioning of the camera 54 with respect to the person 50 provides for a much wider latitude of positioning of the person in front of the enclosure 40 so as to acquire a suitable image.

Figure 4A:
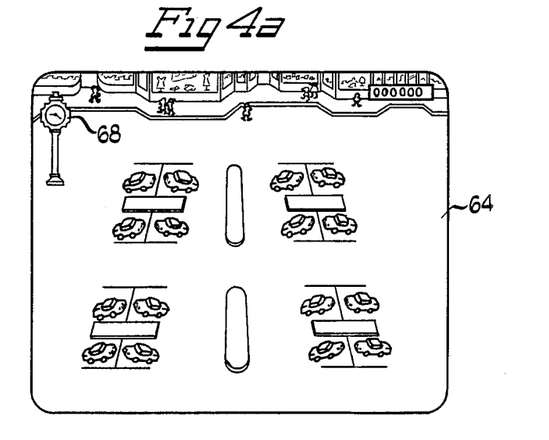
FIGS. 4a, b, c, d, and e are graphical representations of the practice of the method of the game apparatus of the present invention illustrating the play of a typical game as controlled by the video game apparatus of FIG. 1.

For illustrating the practice and operation of the video game apparatus of the present invention and referring now to FIGS. 4a, b, c, d and e, a parking lot elimination game is illustrated wherein the basic play of the game involves the competition between a car controlled by a game player and cars controlled by the game apparatus for empty parking spaces as they appear in the play of the game. After the person's image has been acquired, the game player controls the movement of an assigned car by means of a joystick game control 26, for example as shown in FIG. 1.

Figure 4B:
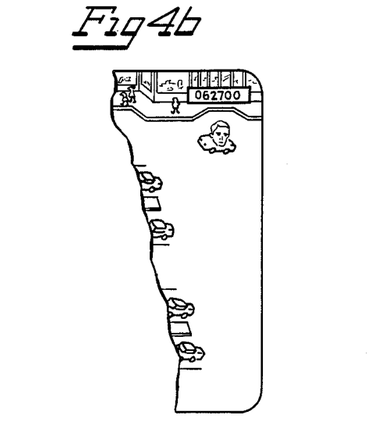
Figure 4C:
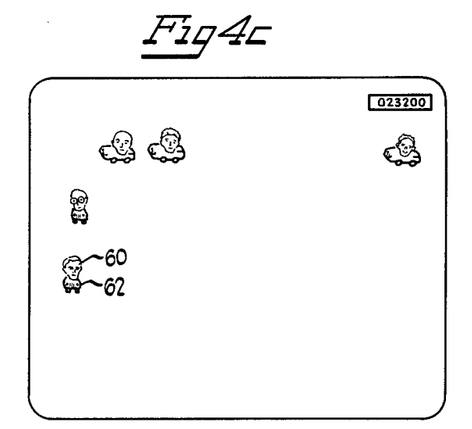
Figure 4D:
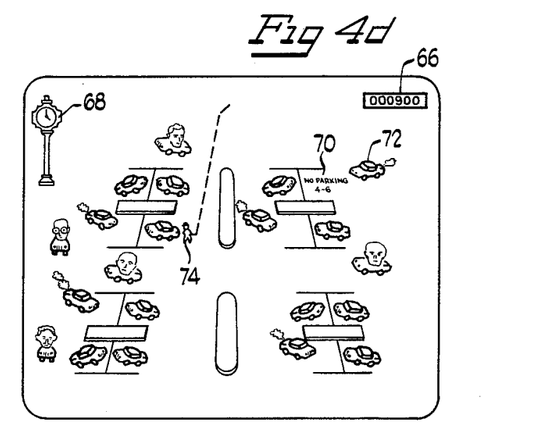
Figure 4E:
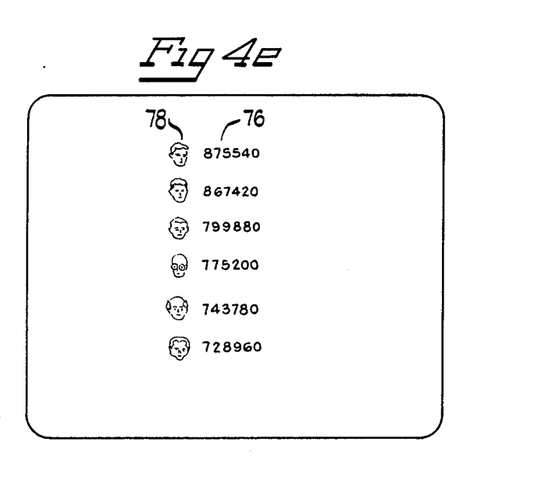

In one illustrative play of the game, six previous champions as determined by the top scoring game players in previous plays of the game are introduced on the display as shown in FIG. 4e. The previously acquired and stored game player images of the champions are appropriately inserted with the video graphics on the game display to position the face of each champion on a respective car as the champions' cars are introduced and moved about the game display. For example in FIG. 4c, the face of the highest scoring champion 60 is displayed atop a car 62 formed by the video display graphics or imagery of the game apparatus.

Referring now to FIG. 4a, the video game apparatus controls the display of a parking lot generally referred to at 64 including various parking spaces and cars filling the parking spaces with a suitable background of a shopping center, store front or the like. The play of the game starts with the six previous champions and their associated cars being displayed and moved about the game display in accordance with the control by the video game apparatus. After the introduction of the champions via their displayed images atop their respective graphically displayed cars, the present game player or challenger is introduced via the acquired and stored personal image atop a displayed car, as shown in FIG. 4b.

In one play of the game, six parked cars at random indicate that they are about to leave their respective spaces, for example by the changing display of tail lights, backup lights, puffs of exhaust smoke, etc. As the six parked cars vacate their respective spaces, the game player or challenger moves the assigned car about the parking lot display via the joystick control to attempt to position the player controlled car in one of the empty parking spaces while the video game apparatus controls the six champion cars to obtain one of the empty parking spaces, as shown in FIG. 4d.

Thus, during the play of the game, one of the seven cars will be eliminated, the car that is eliminated being either one of the six champion cars or the player's car. When the game player either obtains a parking space or is eliminated, the round of play is stopped.

For further enhancement of game playing entertainment, a scoring register indicated at 66 in FIG. 4d increases a score count during the parking space elimination round so that the longer the game player waits to enter his or her car into an empty parking space, the higher the score. However, the longer the player waits to position the car in an empty parking space, the higher the risk of being eliminated by the other six cars. A predetermined number of rounds are provided by the video game apparatus until the present game player is either eliminated or is the sole survivor with each successive round providing one less empty parking space as one of the previous champions is eliminated.

To further enhance the play of the game, a clock display is provided as indicated at 68 in FIGS. 4a and 4d for displaying a progression of time as the play of the game continues. Further, one or more of the parking spaces are marked as indicated at 70 in FIG. 4d with a suitable no parking designation such as "no parking from 4 to 6". As the displayed clock time progresses at a higher than real time speed, any car that parks in the space with the "no parking" designation is towed away by a tow truck if the clock time corresponds to the "no parking" time. Thus, if one of the non-competing parked cars 72 in FIG. 4d is parked in one of the "no parking" spaces, the car 72 will pull out of the parking space without warning as the clock display approaches the beginning of the "no parking" time.

To further enhance game activity and provide signals indicating that a parking space will soon be vacated, a pedestrian or shopper 74 in FIG. 4d moves onto the display so as to approach a car. The video game apparatus controls the display of the pedestrian 74 so as to approach a car and at random the pedestrian will either enter the car and vacate the parking space or at other times will drop off a package at the car and return to a store without removing a car.

Additionally, simulated collisions are detected by the video game apparatus. For example, if a car is involved in two collisions, it is automatically eliminated. Accordingly, if the game player can cause collisions by the competing champions' cars, the game player's score will be increased and the game player will benefit from the elimination of a competing car and will also receive a scoring bonus. Further, any car involved in a collision will be controlled by the video game apparatus to have a suitably damaged display condition and slower performance and activity for competing for the parking spaces.

After the play of the game as determined by either the survival of the game player or elimination during one of the rounds, the play of the game ends with a display of the top six scores as indicated in FIG. 4e including the respective score 76 and the respective game player image 78. If the present game player or challenger has obtained a higher score than one of the previous six champions, the game player display of the new high scorer and his or her associated score replaces one of the previous six champions and is included in the display in FIG. 4e. If the game player or challenger does not achieve a score higher than one of the previous six champions, the previous six champions are displayed along with their respective scores as shown in FIG. 4e.

Figure 5:
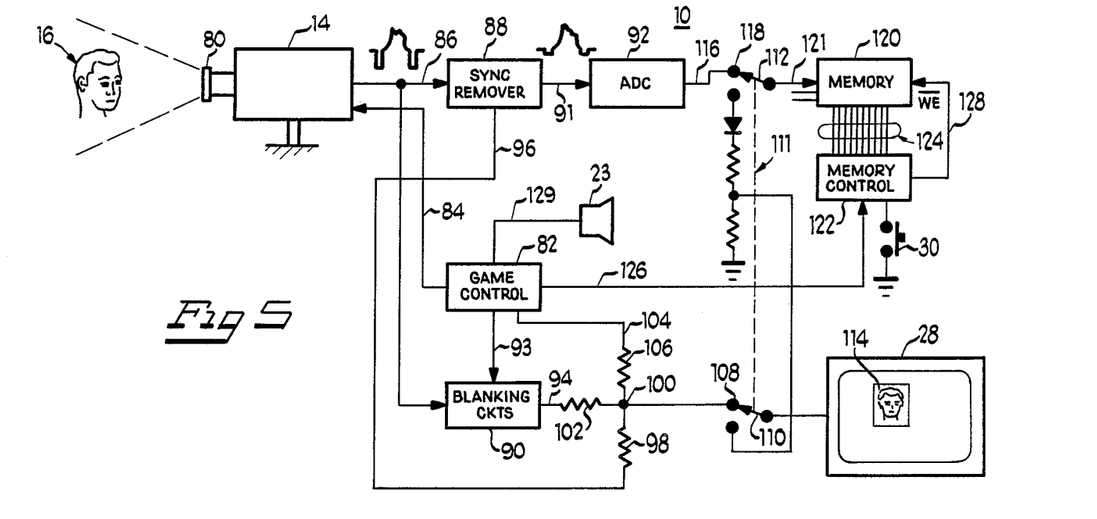
FIG. 5 is a block diagram and schematic representation of portions of the video game apparatus of FIG. 1 and the control circuitry thereof.

Referring now to FIG. 5 and considering the detailed structure and operation of the video game apparatus 10 of the present invention, the camera 14 includes a prefocused lens 80 for acquiring an image of the face or head 16 of a person. The operation of the camera 14 to acquire the image is synchronized by game control circuitry referred to at 82 and typically including a microprocessor. The game control circuitry 82 provides horizontal and vertical synchronization pulses to the camera 14 as indicated at 84.

The camera 14 at 86 outputs a composite video and synchronization signal that is connected to a synch remover circuit 88 and to blanking circuits 90. The synch remover circuit 88 removes or strips the synchronization signals and provides a resulting video output at 91 with blanking pedestal signals to an analog to digital converter stage 92. The blanking circuits 90 in response to blanking horizontal and vertical signals at 93 provides an output at 94 that represents the acquired image signal for appropriate presentation in the game display at 28. The input 93 is provided by the game control circuitry 82. The synch remover 88 at output 96 provides the video image data from the camera 14 to a summing junction 100 through a summing resistor 98. The blanking output 94 from the blanking circuit 90 is connected through a summing resistor 102 to the summing junction 100.

Further, the game control circuitry 82 provides an output 104 representing computer generated imagery or video graphics that is connected to the summing junction 100 through a summing resistor 106. The summing junction 100 is connected to a first position switch contact 108 of a switch 110. The switch 110 forms a first switch pole of a double pole-double throw switch arrangement 111 with a second switch pole of the switch arrangement 111 being provided by a switch 112. The switch arrangement 111 in FIG. 5 is shown in the operative position corresponding to a store or write mode of the game apparatus 10 wherein the acquired image of the person at 114 is displayed on the display 28 and the person's image data is acquired and stored by the video game apparatus 10.

The analog to digital converter stage 92 outputs at 116 the digitized personal image data, the output 116 being connected at 118 to the first switch position of the switch 112.

Assuming for illustrative purposes that the person's image data is to be digitized to only two levels of illuminance, i.e. white and black, the digital output at 116 with respect to time is either a logical level one or zero. Assume further that the image of the person includes 32 samples or pixels horizontally and 32 samples or lines vertically for storage by the video game apparatus 10. Thus, the video game apparatus 10 stores the image of the person as 1,024 stored values corresponding to the quantized brightness of the image of the person's face 16 and the corresponding video signals at 86 and 96. Accordingly, for the purposes of storing a person's image, a 1k by 1 bit random access memory 120 with 1,024 storage locations is provided. The person's image 114 as defined by the 32×32 pixel array includes a surrounding background frame about the head and facial features of the person. It should be understood that in various embodiments of the present invention, various formats may be utilized for the person image array such as rectangular and including different array sizes in terms of pixels.

For incorporation of the individual's image display 114 into the overall game display at 28, it should be realized that 32 pixels per line represents only a relatively small portion of a total scan line in a standard television format. Assume further that for illustrative purposes the digitized image of the person at 114 is to occupy approximately 15% of the approximately 55 microseconds required to display a single horizontal line out of a total of 63.4 microseconds total horizontal interval including blanking and retrace time. Thus, if the analog to digital converter stage 92 samples the incoming video signal at 90 at a rate of 4 MHz for example, then each pixel display is approximately 250 nanoseconds and the 32 pixels occupy approximately 8 microseconds or 15% of a full displayed horizontal line. For example, for a game display at 28 having a width of 12 inches, the person's image 114 would occupy 1.8 inches out of the total width of 12 inches. Of course, if the sample rate of 4 MHz is increased, a smaller image will result. The memory 120 operates with an access speed that is suitable for the sampling rate.

Accordingly, the memory 120 receives the digitized, sampled personal image at 32 memory locations of one digital data bit for each horizontal line. A memory control stage 122 over address lines 124 controls the appropriate storage of the data at 116 through the switch 112 into the memory 120 at data input/output 121 in accordance with delayed horizontal and vertical synch signals at 126 from the game control circuitry 82 for appropriate timed addressing of the memory 120 to store the 1,024 bits of personal image data. Thus, the address lines 124 on ten individual control lines increase 32 digital data bits for each horizontal line over the full range of 1,024 address bits. The memory control stage 122 also controls the read/write mode of the memory 120 via a write enable control line 128. Typically, the memory element 120 is responsive to a low signal level over the line 128 to provide the write mode.

Thus, with the switches 110 and 112 of the switch arrangement 111 in the position shown in FIG. 5 for the write mode, the personal image data is stored in the memory 120 and the person's image 114 is displayed at display 28 along with any desirable video graphics or computer generated imagery. In an alternate arrangement, the synch signals at 96 from the synch remover 88 may be provided by the game control circuitry 82.

The game player controls the selection of the image data that is to be stored in the memory 120 by actuation of the push button control 30. Accordingly, the game player can view the displayed image 114 on the display 28 and can properly position himself or herself such that the face is framed correctly and with the desired facial expression prior to operation of the push button 30 and the storage of the personal video image. The game control circuitry 82 also controls audio game information via output 129 connected to the speaker 23.

Figure 6:
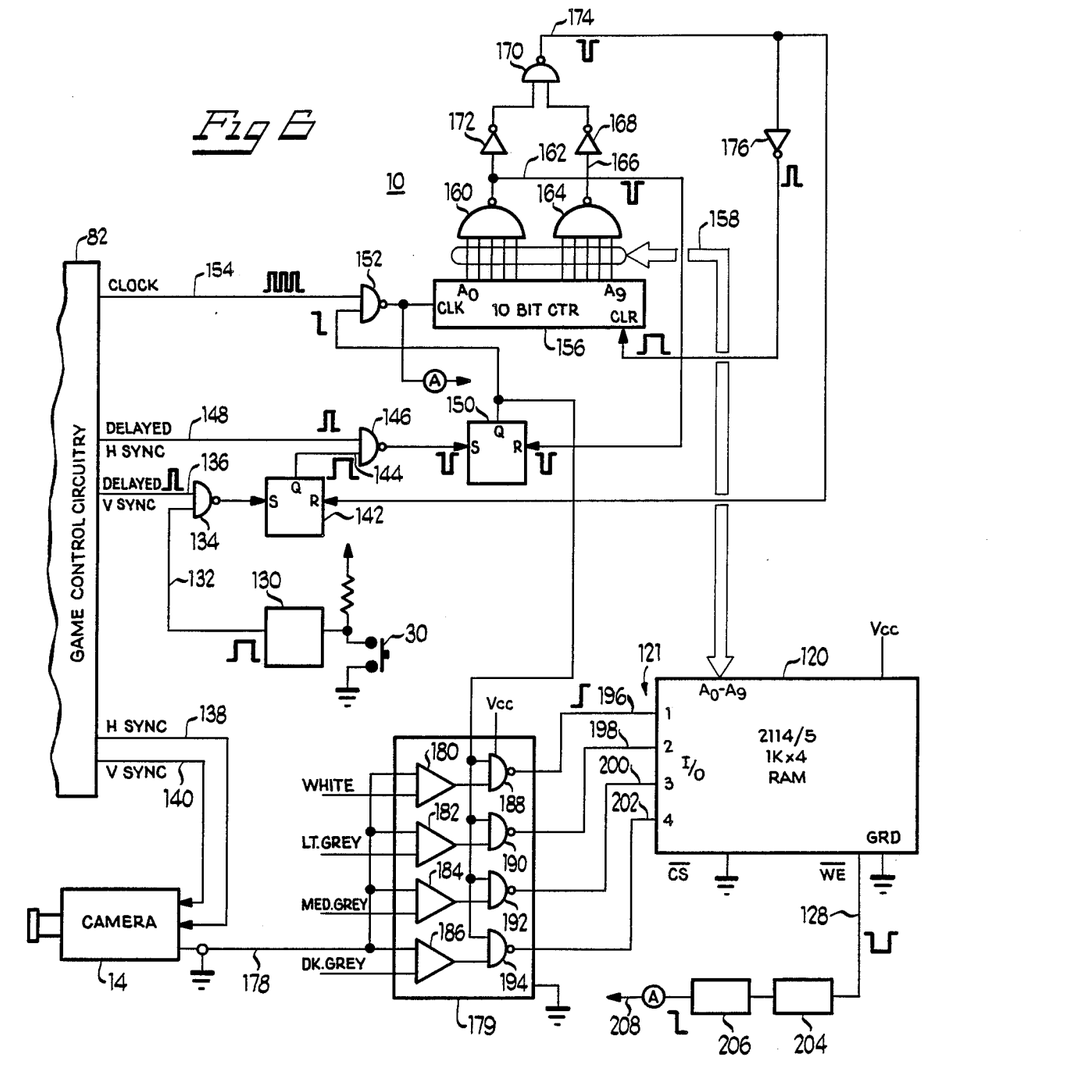
FIG. 6 is a block diagram schematic representation of the detailed circuitry of a preferred embodiment of portions of the control circuitry of the video game apparatus of FIG. 5 illustrating operation in a write or store mode.

Referring now to FIG. 6 and considering a specific embodiment of portions of the video game apparatus 10 of FIG. 5, the circuitry is depicted in the write or store mode and the storing of the game player image proceeds when the push button control 30 is actuated.

The push button 30 upon actuation is arranged to trigger a one-shot multivibrator stage 130. The multivibrator stage 130 upon triggering produces a single pulse at output 132 of approximately 15 milliseconds or greater duration approximately equal to or exceeding the time of a complete vertical frame scan of the display. The output 132 of the multivibrator stage 130 is connected to one input of a two input NAND gate 134. The second input of the gate 134 is connected to a delayed vertical synch pulse signal line 136 from the game control circuitry 82. The output of the gate 134 is connected to the set input of a flip-flop 142. The delayed vertical synch pulse line 136 provides the appropriate delayed synch signals that define the line of the raster at which the top of the stored personal image display is to start. The game control circuitry 82 also provides the horizontal and vertical synch signals at 138, 140, respectively, to control the camera 14.

Thus, upon actuation of the push button 30 and the arrival of the next occurring delayed synch pulse at 136, the gate 134 is enabled to set the flip-flop 142. The Q output of the flip-flop 142 is connected to a first input 144 of a two input NAND gate 146. The second input of the gate 146 is connected to a delayed horizontal synch pulse signal line 148 supplied by the game control circuitry 82.

The output of the gate 144 is connected to the set input of a flip-flop 150. The Q output of the flip-flop 150 is connected to one input of a two input NAND gate 152. The second input to the NAND gate 152 is connected to a clock signal 154 from the game control circuitry 82. In the specific embodiment being discussed, the clock signal at 154 supplies clock pulses at a rate approximately equal to the four MHz rate discussed hereinbefore. The output of the gate 152 is connected to the clock input of a 10 bit counter 156. The delayed horizontal synch pulse signal 148 supplies horizontal synch pulse signals to define the point along the horizontal scan direction at which the stored personal image data at the left edge thereof is to be located on the display 28. The ten bit counter 156 on data output lines 158 develops the address signals corresponding to the address lines 128 of FIG. 5 to appropriately address the memory 120 for storage of the person's image data, the data output lines 158 defining $2^{10}$ digital address states.

At the appropriate time and relative scan position at which the upper left hand corner of the game player display is to be started with respect to the display 28, the flip-flop 142 is set to enable the gate 146. The output of the gate 146 sets the flip-flop 150 and the gate 152 is enabled to pass the clock signals on 154 to clock or increment the 10 bit counter 156 by one count upon the occurrence of each clock pulse, negative going transitions at the clock input to the counter 156 incrementing the counter by one count.

Thus, as the game control circuitry 82 controls the scanning of the display 28, a delayed vertical synch pulse at 136 occurs when the first line is scanned at which the top of the person's image is to be displayed and the flip-flop 142 is set in response thereto.

Next, a delayed horizontal synch pulse occurs at 148 at the time representing the left hand corner of the person's image and the flip-flop 150 is set to enable incrementing of the counter 156.

As the counter 156 increments in count to a count of 32 at 158, the first five address lines A0 through A4 of 158 will all be at high logical levels. The A0 through A4 address lines are connected to five respective inputs of a five input NAND gate 160. When the counter 156 reaches a count of 32, the output of the NAND gate 160 provides a low logic or zero logic signal at 162 which functions to indicate an end of line signal. The end of line signal at 162 is connected to the reset input of the flip-flop 150.

Thus, upon the occurrence of the end of line signal 162, the Q output of the flip-flop 150 is conditioned to a low logic level and the gate 152 is disabled. With the gate 152 disabled, the clock pulses 154 are not passed by the gate 152 and the counter 156 remains frozen or static at the 32 count output until the arrival of the next delayed horizontal synch pulse signal at 148.

Operation of the counter 156 continues in accordance with the delayed horizontal and vertical synch pulses at 148 and 136, respectively, until the output of the counter at 158 reaches 1,024. The A5 through A9 high bit address lines at 158 from the counter data output 156 are connected to five respective inputs of a five input NAND gate 164. When the counter 156 reaches a count of 1,024, the A5 through A9 outputs are all ones or high logic levels and the output 166 of the gate 164 is a low level logic signal. The output 166 of the gate 164 is connected through an inverter 168 to one input of a two input NAND gate 170. The end of line signal at 162 is connected through an inverter gate 172 to the second input of the NAND gate 170. The output 174 of the NAND gate 170 functions as an end of field signal and is connected through an inverter 176 to the clear input of the counter 156. The end of field signal at 174 is also connected to the reset input of the flip-flop 142.

When the counter 156 reaches a count of 1,024, the end of field signal at 174 is generated to reset the flip-flop 142, the Q output of the flip-flop 142 returning to a low level so as to disable the gate 146. Operation of the counter 156 ceases with the counter in the zero state.

The memory 120 in response to the address signals at 158 is stepped through or addresses the 1,024 address locations for appropriate storage of the game player image data at data input/output 121. Specifically, the video output 178 of the camera 14 is connected to one input of each of four flash converters 180, 182, 184 and 186 of a converter stage 179. A second input of each of the flash converters 180, 182, 184 and 186 is connected to a respective reference voltage corresponding to luminance levels of white, light gray, medium gray and dark gray, respectively. Thus, each of the converters 180, 182, 184 and 186, respectively, switches or toggles in accordance with its respective luminance input reference signal.

The output of each of these flash converters 180, 182, 184 and 186 is connected to the first input of a respective two input NAND gate 188, 190, 192 and 194. The second input of each of the gates is connected to the Q output of the flip-flop 150. The output of each of the gates 188, 190, 192 and 194 is connected to a respective one of the data lines 196, 198, 200 and 202 of the data input/output 121 of the memory 120.

For the four luminance levels illustrated in FIG. 6, the memory 120 is a 1K by four bit random access memory device. The write enable line 128 of the memory 120 is connected to the output of a one-shot multivibrator stage 204. The trigger input to the one-shot monostable vibrator stage 204 is connected to the output of another one-shot multivibrator stage 206. The trigger input 208 to the one-shot multivibrator stage 206 is connected to the output of the gate 152 at the clock input of the counter 156. Thus, the clock pulses to the counter 156 are delayed by the one-shot multivibrator 206 and the one-shot multivibrator stage 204 provides an appropriate write-time pulse width to enable proper recording of the data at appropriate address locations of the memory 120.

As the counter 156 steps the memory 120 through the appropriate addresses, the person's image data is recorded via the luminance levels at 196, 198, 200 and 202 at the appropriate address locations to store luminance levels for 1,024 pixels in corresponding memory locations. Accordingly, the memory 120 includes stored therein at each memory location a one or zero logic level representing the quantized image of the person derived from the camera 14 by the converter stage 179.

Figure 7:
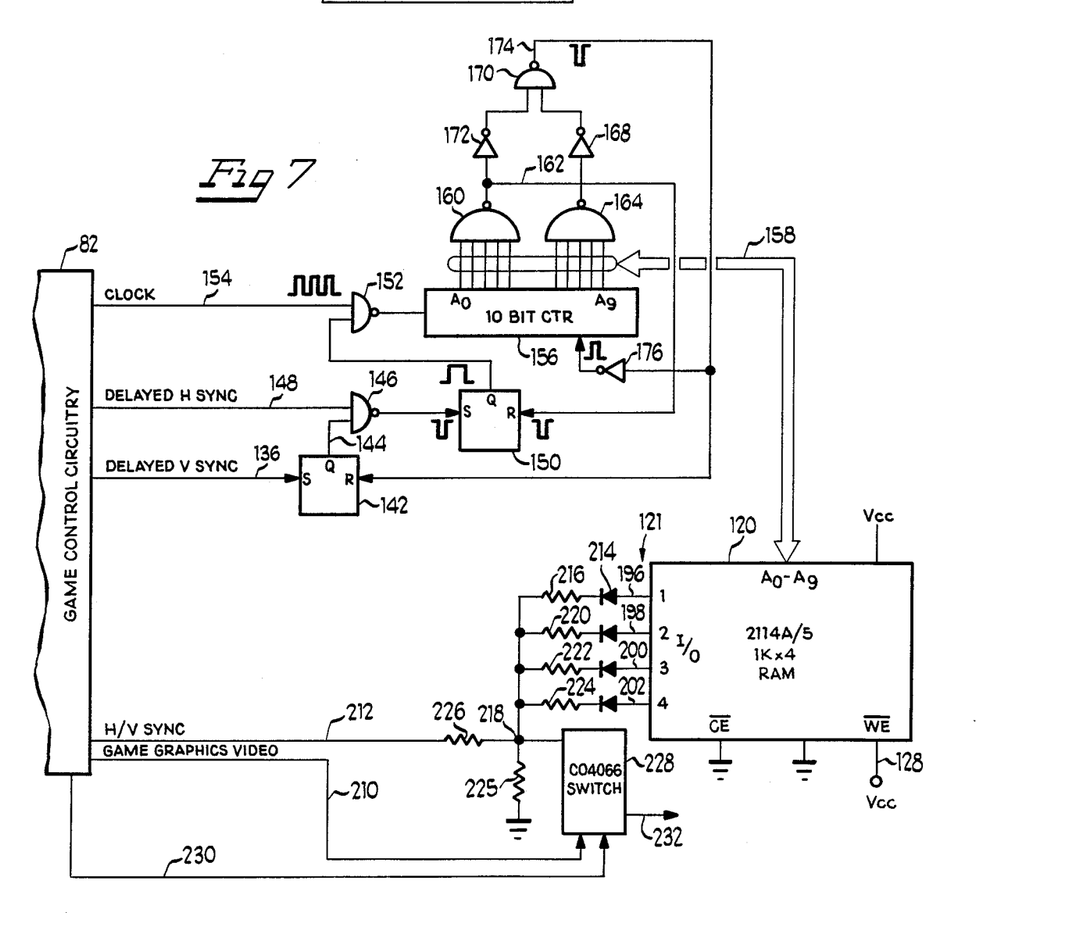
FIG. 7 is a block diagram and schematic representation of the detailed circuitry of a preferred embodiment of portions of the control circuitry of the video game apparatus of FIG. 5 illustrating operation in a read or playback mode.

Referring now to FIG. 7 and considering the details of a specific embodiment of the video game apparatus 10 for operation in the read or playback mode of operation to control the selective incorporation of the person's image 114 on the display 28 in coordination with the video game graphics or imagery, the memory 120 is conditioned to the read or playback mode as symbolized by the write enable line 128 being connected to a high signal level such as through a pull-up resistor or the like. The game control circuitry 82 appropriately outputs delayed horizontal synch pulse signals 148 and delayed vertical synch pulse signals at 136 in accordance with the stored game program and control circuitry and in response to the operation of the game player controls for appropriate display of the game player or other person's image on the display 28 in each frame of the displayed video game graphics and at desired locations thereof in accordance with the appropriate play of the game; e.g. the parking lot elimination game discussed in connection with FIG. 4.

Accordingly, when the game control circuitry 82 requires the selective incorporation of the person's image at a particular desired location on the display 28 in a particular frame of the game display and at a particular location, the appropriate generation of synch signals at 136 and 148 conditions the counter 156 to appropriately address the memory 120 via address lines 158 to read out the stored personal image data at the data input/output 121 on lines 196, 198, 200 and 202.

For example, if the stored image of a person is desired to be read out and displayed at various locations of the video game graphics display 28, the game control circuitry 82 via synch signals 136 and 148 controls operation of the counter 156 and the memory 120 at the appropriate time during each frame representing the desired location on the display 28 for repetitive and successive read out of the data at 196, 198, 200 and 202 representing the image of the person. Of course, it should be understood that a person's image can be read out for display a multiple number of times during each frame of display if desired by resetting the counter appropriately.

The game control circuitry 82 provides a game graphics video output at 210 representing video signals for the display at 28 of the desired changing video game graphics and imagery for the play of a particular game such as the parking lot graphics of FIG. 4. Further, the game control circuitry 82 provides a composite horizontal-vertical synch signal at 212. The video signal 210 in a specific embodiment includes appropriate video blanking corresponding to the field positions of the display 28 at which the person's image is to be displayed in the particular frame.

The data line 196 is connected through the series combination of a diode 214 arranged anode to cathode and a resistor 216 to a summing point 218. Similarly, the data outputs 198, 200 and 202 are connected through respective diodes and resistors 220, 222 and 224, respectively, to the summing point 218. The synch signal 212 is connected through a resistor 226 to the summing point 218.

The summing point 218 is connected to one video input of an electronic switch 228. The game graphics video output 210 is connected to a second video input of the electronic switch 228. The electronic switch 228 is controlled to selectively provide one of the inputs 218 or 210 at a video output 232 as controlled by a switch control line 230. The switch control line 230 is provided by the game control circuitry 82. The video output 232 of the switch 228 is connected to the video drive inputs of the display 28.

In specific embodiments where the game control circuitry 82 provides appropriate blanking of the game graphics video information at the locations of the inserted personal image data from 218, a single output of game graphics video and horizontal-vertical synch composite data signal can be summed with the personal image data at 218 and the summed signal output to the video display at 232.

The resistors 216, 220, 222 and 224 are selected such that the resistance of resistor 216>220>222>224. Thus, a logical 1 appearing at data output line 196 develops a voltage at 218 approximately equal to: ($V_{cc}$ $R_{225}$) /($R_{225}$+$R_{216}$) corresponding to a maximum white level video signal at 218. Similarly, a light gray level signal corresponding to a data output at line 198 would develop a somewhat lower voltage equal approximately to ($V_{cc}$ $R_{225}$) /($R_{225}$+$R_{220}$) corresponding to a light gray video signal at 218.

Accordingly, by varying the time delay of the delayed horizontal synch pulse signal 148 and the delayed vertical synch pulse signals at 136 with respect to the synch signals at 212, the stored image of a person can be inserted or incorporated with the generated video game graphics at any desired location on the display 28 for each different display frame.

In various specific embodiments, the video game apparatus 10 is controllable to store a plurality of personal images of one or several different persons either for purposes as explained hereinbefore in connection with the parking lot elimination game of FIG. 4 or for purposes of obtaining and displaying different poses or facial expressions of a person. Accordingly, for the storage of multiple personal images, additional memory is required with appropriate address locations and storage of the video data representing the images of a person from the camera 14 via the converter stage 179.

Accordingly, considering the storage of several different images of a single person, the display of various images are provided in a predetermined sequential format with the person either smiling or frowning or with the mouth successively being opened and closed for particular effects such as animated effects or to simulate speaking or the like. Further, where mouth movement of the person is provided by the multiple stored game images, the game control circuitry 82 provides appropriate coordinated noise or electronic speech sounds.

In accordance with other specific embodiments of the video game apparatus 10, the variation of the clock period of the clock signal at 154 by the game control circuitry 82 can be utilized to directly provide a display of different proportions. For example, if the clock frequency at 154 is changed from four $MH_z$ in the write or record mode to 6 $MH_z$ during playback, the displayed personal image would be approximately two-thirds of its normal width. Conversely, decreasing the clock rate to 3 $MH_z$ during playback from 4 $MH_z$ during write would elongate or stretch the person's image horizontally by approximately 1.3 times.

Thus, entertaining enhancements can be effected for amusing or exaggerated results. Other special effects may also be obtained by the manner in which the recorded personal video image data is read out such as distorted or shifting images as obtained, for example, by varying the starting point of each of the 32 displayed horizontal lines of the person's image. Accordingly, it should be understood that the video game apparatus 10 of the present invention in various specific embodiments includes the read out of the person's image data at various rates and locations in the display to achieve what is commonly known as special effects to obtain any desired shape or image effect including the horizontal or vertical stretching or compressing of the images.

Considering a specific embodiment of the video game apparatus for providing increased resolution of a person's image, ten comparators are provided in the converter stage 179 and a 10 line to 4 line encoder is utilized to output the luminance data for storage. Thus, ten levels of luminance are provided for more accurate representation of the person's image.

Figure 8:
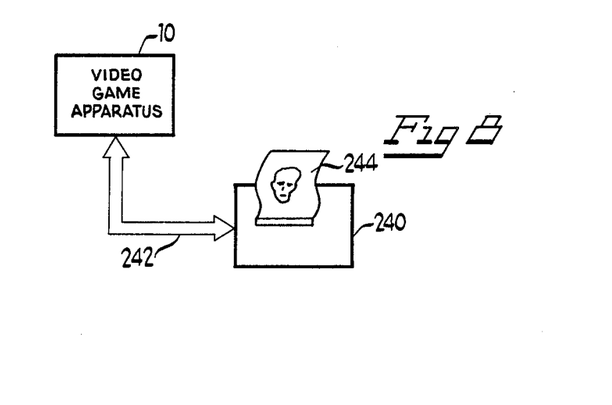
FIG. 8 is a block diagram representation of the video game apparatus of FIG. 1 illustrating the printout of a stored image and other data.

Referring now to FIG. 8, the video game apparatus 10 in a specific embodiment controls an output device 240 over control lines 242 to provide a printout or other hard copy representation 244 of the game player image and associated score data, for example, as a special bonus to high scoring players.

In yet another embodiment, an image of an entity could be acquired using a video camera similar to 14 but not necessarily within the video game housing or enclosure 12. For example, it might be desirable and entertaining to provide a game wherein the various objects controlled and moved about the video display during the play of the game incorporate the image of the face or head of a publicly known personality or some other being known to the player. Thus, in the parking lot game, it might be desirable to use the faces of race drivers for some of the cars. In fact, the person's face as represented at 16 in FIG. 5 could itself be a pictorial representation such as a photographic slide projection which the video camera 14 then digitizes with circuitry like that of FIGS. 5 or 6.

Particularly if the image of the face or head of a publicly known personality is to be included, it may be convenient to include the stored representation of that person's image in permanent read only memory or PROM. This could be accomplished using an apparatus incorporating the circuitry illustrated in either FIGS. 4 or 5 except that the 1,024 stored values corresponding to the quantized brightness of the image of the face of the person would then be transferred to permanent memory. For example, the RAM could be used to "burn" a PROM in a conventional manner now employed in the video game industry. The PROM would then be substituted for the RAM 120 in the read or playback mode illustrated in FIG. 7. In some situations it may be desirable to enhance the acquired image by manually rewriting or altering some of the stored values in RAM 120, as for example, to improve contrast by changing the data corresponding to the luminance level of a particular pixel, before "burning" the PROM.

While there have been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A video game system comprising:
   user input apparatus for providing signal outputs responsive to user provided stimulus;
   control means for providing a video game audiovisual presentation, said presentation comprising a sequence of display images, said display images each comprising the combination of a plurality of predetermined imagery segments including a preselected character imagery segment, said sequence order of presentation determined responsive to a non-user defined predefined set of game rules and responsive to the user input apparatus;

means for creating a user video image responsive to the user input apparatus including means for storing said user video image in a memory; and means for associating said user video image with said preselected character imagery segment such that said user video image is incorporated into said audiovisual presentation of said video game.

2. The video game as in claim 1 further comprising:

means for associating a user selected one of a predefined plurality of video images to be utilized as said user's visual image in the video game audiovisual presentation.

3. The system as in claim 1 wherein movement of said user video image amidst the audiovisual presentation is responsive to said user input apparatus.

4. The system as in claim 1 wherein said user video image is selected from a plurality of preselected character function images responsive to said user input apparatus.

5. The system as in claim 1 wherein said input apparatus is further comprised of means for providing as said user video image a visual image of the player utilizing said input apparatus and means for storing said user video image in said memory.

6. A video game system comprising:

user input apparatus for providing signal outputs responsive to user provided stimulus;

control means for providing a video game audiovisual presentation, said presentation comprising a non-user defined predefined sequence of displays, each display comprising a combination of sub-images selected from a set of predefined sub-images according to a predefined set of game rules, responsive to user input apparatus;

means for creating a user video image responsive to the user input apparatus including means for storing said video image in a memory; and means for associating said user video image with a preselected character function of said video game such that said user video image forms one of the said set of predetermined sub-images utilized by said control means in providing said audiovisual presentation of said video game.

7. Video game apparatus comprising:

means, including video imaging means, for acquiring a video image of at least a portion of a being and generating video signals representing said acquired video image;

means responsive to said video signals for encoding said video signals into digital data;

means for storing said digital data;

a video game including a display;

player actuable video game control means for controlling the video game image displayed on said game display; and display generating means controlled by said video game control means for generating video game display signals to said video game display and for selectively incorporating said stored digital data for display of a display video image representing said acquired video image on said video game display.

8. The video game apparatus of claim 7 wherein said storing means further comprises read/write memory means responsive to said encoding means for storing said digital data.

9. The video game apparatus of claim 8 wherein said display generating means comprises means for controlling the read out of said stored encoded signals from said read/write memory.

10. The video game apparatus of claim 8 wherein said storing means further comprises means for transferring said digital data from said read/write memory to a read only memory.

11. The video game apparatus of claim 7 wherein said video game control means comprises means for controlling said display generating means to display said display video image representing said acquired video image as said acquired video image is being acquired by said video imaging means.

12. The video game apparatus of claim 7 wherein said storing means further comprises means for storing digital data from encoded video signals representing a plurality of acquired images as stored video image data.

13. The video game apparatus of claim 12 wherein said plurality of acquired images correspond to acquired images of a number of different beings.

14. The video game apparatus of claim 12 wherein each of said plurality of acquired images corresponds to a single being.

15. The video game apparatus of claim 14 wherein said video game control means comprises sequential display control means for controlling said display generating means to control said display for display of display video images representing one or more of said plurality of acquired images in a predetermined sequential format to provide an animated representation of the being.

16. The video game apparatus of claim 15 wherein said video game control means further comprises means for generating an audio presentation correlated to said video display, said display video images including representations of open and closed mouth acquired video images.

17. The video game apparatus of claim 7 wherein said stored video image data represents the face of a person.

18. The video game apparatus of claim 7 wherein said video game control means controls said display generating means to generate said video game display signals and said incorporated digital data to provide a plurality of sequential display frames.

* * * * *

UNITED STATES PATENT AND TRADEMARK OFFICE
Certificate

Patent No. 4,710,873                                                 Patented: December 1, 1987

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeffrey D. Breslow, Highland Park, IL; Howard J. Morrison, Deerfield, IL; Steven P. Hanson, Winnetka, IL; Russell G. Rasmussen, Skokie, IL and Ralph H. Baer, Manchester, NH.

Signed and Sealed this First Day of June, 1999.

WILLIAM GRANT
*Supervisory Patent Examiner*
Art Unit 2786